P. S. LANCHICK.
DOMESTIC AIR HEATER.
APPLICATION FILED MAY 12, 1917.
1,300,625.
Patented Apr. 15, 1919.
2 SHEETS—SHEET 2.
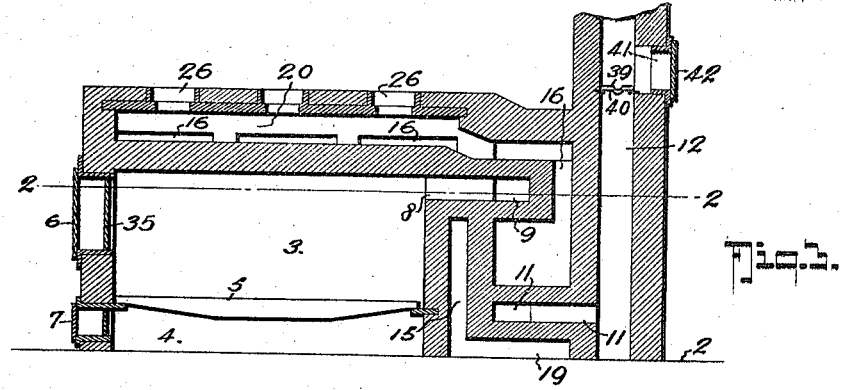
Fig. 3.
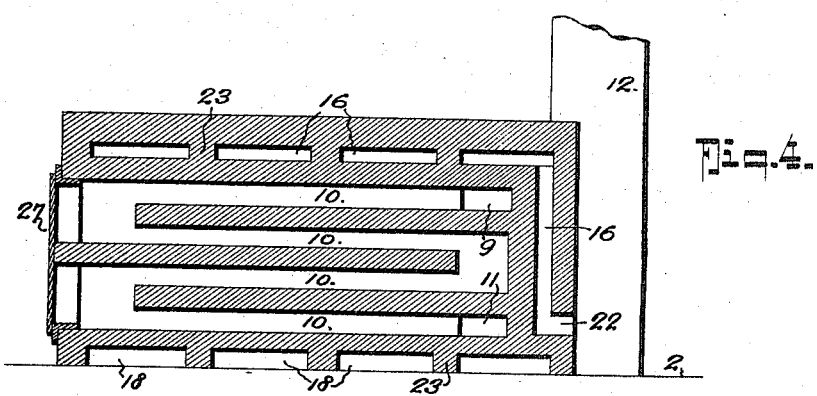
Fig. 4.
Fig. 5.
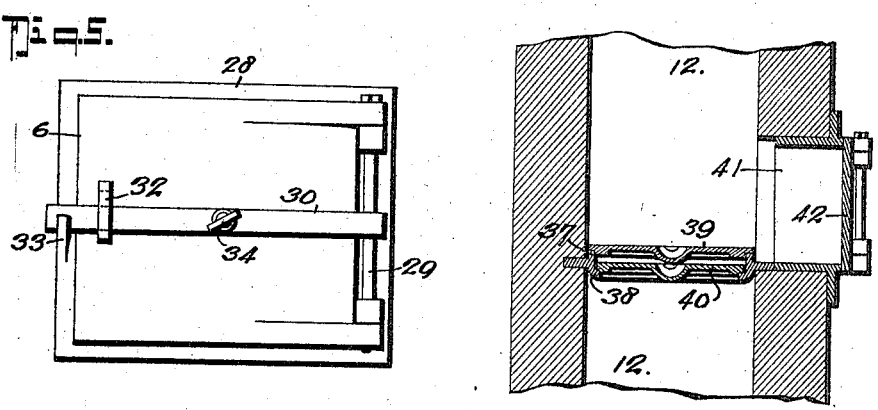
Fig. 7.
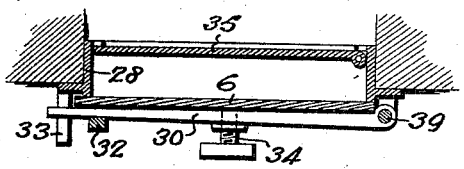
Fig. 6.
INVENTOR
P. S. Lanchick.
BY
Fred G. Dieterich
ATTORNEYS

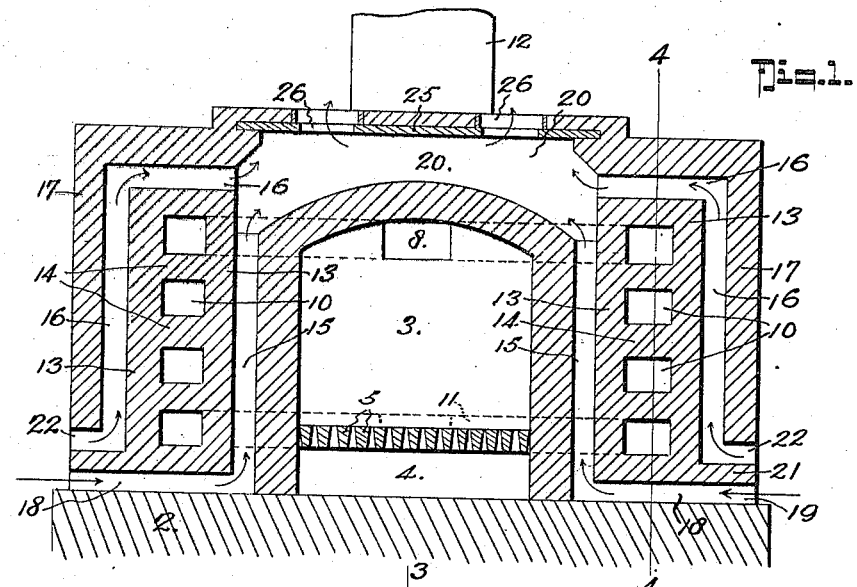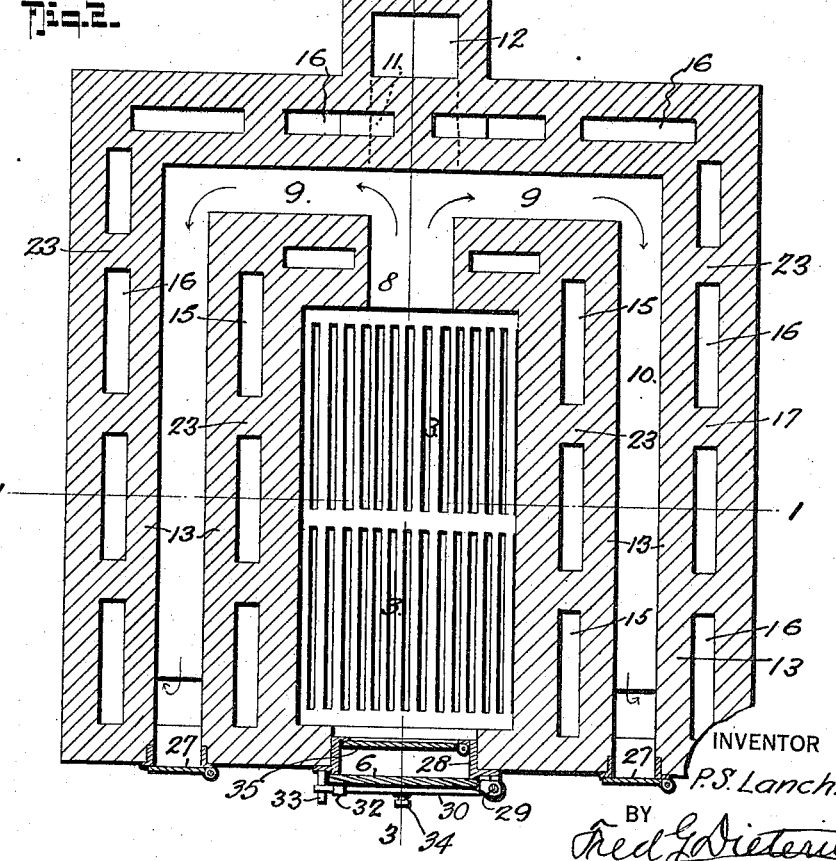

UNITED STATES PATENT OFFICE.

PETER S. LANCHICK, OF VICTORIA, BRITISH COLUMBIA, CANADA.

DOMESTIC AIR-HEATER.

1,300,625.          Specification of Letters Patent.          Patented Apr. 15, 1919.

Application filed May 12, 1917. Serial No. 168,202.

*To all whom it may concern:*

Be it known that I, PETER S. LANCHICK, a citizen of the Dominion of Canada, residing at Victoria, in the Province of British Columbia, Canada, have invented certain new and useful Improvements in Domestic Air-Heaters, of which the following is a specification.

This invention relates to an air heater for domestic use, and is particularly designed to economize fuel by the slow combustion thereof, and by the absorption of the heat of such combustion within the structure of the heater, where it is imparted to air conducted through such structure for subsequent circulation to the several rooms of the house.

With this object in view the heater is built of heat non-conducting material such as brick or concrete with straight reversed flues between the furnace chamber and the chimney, through which flues the products of combustion may pass back and forth before delivery to the chimney and impart its heat to the walls of the flues. Between these flues and the walls of the furnace chamber and between them and the external walls of the heater, is a series of air ducts through which air is passed for delivery to a common hot air chamber over the furnace, from which hot air chamber the air may be conducted to the various rooms of the house, as required.

The doors communicating with the furnace and ash pit are specially designed to effectively close the door-ways to prevent leakage of external air to the furnace so as to retard combustion, and permit carbonization of the fuel without oxidation. In the furtherance of this object the chimney or uptake from the furnace is provided with means by which it also may be effectively closed at will.

To enable the combustion to be accelerated as desired, a supplementary door loosely fitting the doorway is hinged within the main door, which supplementary door has provision for admission of a limited amount of air.

The particular construction of the heater is fully set forth in the following specification, reference being made to the drawings by which it is accompanied, in which:

Figure 1 is a vertical cross section of the heater on the line 1—1 in Fig. 2.

Fig. 2 is a sectional plan on the line 2—2 in Fig. 3.

Fig. 3 is a vertical longitudinal section on the line 3—3 in Fig. 2.

Fig. 4 is a vertical longitudinal section on the line 4—4 in Fig. 1.

Figs. 5 and 6 are enlarged details of the door fastening, and

Fig. 7 is a section through the chimney closures showing them in position on their seats.

In these drawings 2 represents the foundation of the heater which may be of cement concrete. On this foundation 2 is built a furnace chamber 3 of brick or concrete having an ash pit 4 beneath the cast iron grate bars 5.

In the front wall of the furnace chamber is a charging aperture closable with a door 6 to be specifically described later, and a similar door 7 is provided closing the aperture to the ash pit 4. From the furnace chamber 3 the products of combustion pass through an aperture 8 in the upper part of the back wall to flues 9 delivering to each side into the upper of a series of flue passages 10 arranged along each side of the furnace chamber 3. The adjacent passages 10 are connected at opposite ends to conduct the hot products of combustion back and forth from the upper to the lower, for final delivery through flues 11 to the chimney 12.

The walls and partitions 13 and 14 of these flues 10 are built of brick or the like heat non-conducting material with an air interspace 15 between each wall of the furnace and the adjacent inner wall of the flues, and an interspace 16 between each outer wall of the flues and the outer wall 17 of the heater.

At the back of the furnace there are corresponding interspaces 15 and 16 between the walls of the flues or ducts 9 and 11 and the furnace and outer wall respectively. Air from without is admitted to the inner interspace 15 on each side, through apertures 19 near the bottom of the outer wall 17, which apertures are connected beneath the bottom side flue 10 by an interspace 18, and adjacent apertures 22 deliver from the outside to the lower end of the outer interspace 16 which outer interspace is separated from the bottom interspace 18 as at 21. The upper ends of the interspaces 15 and 16 on each side and back deliver to a hot air space 20 extending across the top of the heater. All these air heating spaces 18, 15 and 16 and that portion of 20 which extends across the top of the side flues 10 have vertical partitions 23, which divide these interspaces into a series of ducts disposed in parallel vertical planes, and provide a means of bonding the walls of the furnace and flues together and to the outer wall 17.

That portion of the hot air chamber 20, which is immediately over the roof of the furnace chamber 3, is closed by a metal plate 25 provided with a series of upwardly flanged apertures 26 to which pipes or ducts are connected for delivery of the hot air to the several rooms of a house. This plate 25 may be covered with a heat protecting covering or brick-work or the like.

The front wall of the heater is, as described, provided with furnace and ash pit doors 6 and 7 and also with doors 27 affording access to the front ends of the side flues 10 for purposes of cleaning.

The furnace doorways are provided with metal mouth rings 28 which have a machined seat for the door joint. The doors are hinged along one side at 29 to the mouth ring, and have a machined seat corresponding to that of the mouth ring. Each door has a latch bar 30 extending horizontally across its mid-depth, which latch bar is hinged at one end at 29 to the mouth ring and at the other end passes through a keeper 32 and projects beyond the free edge of the door to engage a detent 33. A screw 34 is threaded through the middle of the latch bar to bear against the center of the door by which screw the machined face of the door may be closed tightly upon the seat of the mouth ring, the hinges of the doors being sufficiently free to permit this slight closing movement of the door upon its seat.

Within the furnace doorway a supplementary door 35 is hinged to open outward, which supplementary door only loosely fits the doorway and may be provided with apertures for the admission of air. This supplementary door is designed to limit and regulate the amount of air admitted when lighting or for stimulating the fire on the grate, when such is necessary.

In the chimney uptake 12 above the level of the heater a metal frame is built in the brick-work. This frame has two seats 37 and 38, one within the other and on different planes, and on each of these seats separate cover plates 39 and 40 are placed; the object being to prevent the entrance of external air and insure slow combustion. These cover plates may be introduced and removed through a doorway 41 closable with a door 42.

With these provisions for preventing access of air to the furnace, the combustion proceeds very slowly and without oxidation, so that the charge of the furnace will produce coke or charcoal according as coal or wood is used. This product may be sold if a demand exists for it or may be consumed later in the furnace by the admission of more air.

By this slow combustion practically all available heat is derived from the fuel and is abstracted from the products of combustion by the heat non-conducting walls of the furnace and its lengthened flues, to be abstracted from them by the fresh air admitted at 21 and 22 and passed between the walls to the hot air chamber 20 for distribution where required.

The house may then be heated with great economy of fuel and the furnace requires a minimum of attention as it only requires to be charged at long intervals.

Having now particularly described my invention, I hereby declare that what I claim as new and desire to be protected in by Letters Patent, is:

1. A domestic air heater which comprises a furnace of non-heat conducting material having a main combustion chamber, and a hot air chamber, a chimney, a series of reversely directed longitudinally extending horizontal flues located at each side of the combustion chamber that communicate at the top with the combustion chamber and at the bottom with the chimney, said horizontal flues at the respective sides of the furnace lying one above the other and communicating one with another *seriatim*, and a series of vertically extended air spaces between the combustion chamber and the adjacent horizontal flues, air-inlet passages beneath the lowermost horizontal flue to convey the air to said air spaces, said air spaces at their upper ends being in communication with the hot air chamber, said hot air chamber lying above the furnace chamber, other vertically extended air spaces toward the outside of the furnace beyond the horizontal flues, ducts for leading air into said other air spaces adjacent to the bottom of the furnace, and other ducts from said other air spaces to the hot air chamber which lie above the uppermost horizontal flues, and air duct outlets from the hot air chamber, all being arranged substantially as shown and for the purposes described.

2. A domestic air heater of non-conducting material, comprising in combination, a furnace chamber provided with a fire grate and doors affording access separately to above and below the grate, the said furnace including a hot air compartment extending across the upper part thereof; a chimney offtake, series of horizontally disposed longitudinally extending flues arranged one series on each side of the furnace chamber; the adjacent flues one series being connected to one another at opposite ends to form a continuous passage from the furnace chamber, the lowermost one of the horizontally disposed flues of each series delivering into the chimney offtake, the said flues being disposed between the walls of the furnace and the exterior wall of the furnace chamber, air spaces surrounding the flue walls, vertical partitions that divide the air spaces, the lower ends of the said air spaces being open to atmosphere and the upper ends of the said spaces delivering into the hot air chamber across the top of the furnace chamber and provision for the connection of distributing pipes to the said hot air chamber.

In testimony whereof I affix my signature.

PETER S. LANCHICK.